United States Patent [19]
Sachtleben et al.

[11] 3,724,734
[45] Apr. 3, 1973

[54] WEB TRANSPORT
[75] Inventors: Carl Lawrence Sachtleben, Haddonfield, N.J.; Erich Hans Steiner, Morrisville, Pa.
[73] Assignee: RCA Corporation, New York, N.Y.
[22] Filed: Mar. 29, 1972
[21] Appl. No.: 239,091

[52] U.S. Cl. .................................. 226/57, 226/154
[51] Int. Cl. .............................................. G03b 1/28
[58] Field of Search......226/55, 56, 57, 58, 108, 117, 226/154, 27

[56] References Cited
UNITED STATES PATENTS
2,626,146  1/1953  Goetz ................................. 226/57
2,793,855  5/1957  Becker ............................... 226/55

Primary Examiner—Richard A. Schacher
Attorney—H. Christoffersen

[57] ABSTRACT

A transport for film, tape, or other type of web having registration holes. The web is guided in a substantially straight path between a drive capstan and a pinch roller which normally urges the web into contact with the capstan. At least one registration pin extends radially from the capstan and is dimensioned and circumferentially positioned to freely enter registration holes in the web. When a registration pin is in a registration hole, the pinch roller is momentarily urged away from the web and the web is pulled forward, causing the trailing edge of the registration hole to engage the registration pin, whereby the web is accurately positioned. The speed of the web does not vary with respect to that of the capstan except during the short registration periods.

9 Claims, 4 Drawing Figures

WEB TRANSPORT

BACKGROUND OF THE INVENTION

Pages of a document are often stored on film on a page per frame basis. The document may be edited by deleting frames, adding frames, or substituting new frames for old ones as described in U.S. Pat. No. 3,600,089, issued on Aug. 17, 1971 to G.O. Walter and assigned to the same assignee as the present application. At some point, it becomes desirous to print the contents of the film and form the pages comprising the document.

One printing apparatus which may be used to reproduce documents stored on film comprises a film projector and a conveyor moving past the projector. The conveyor may, for instance, be a cylindrical rotating drum. Sheets of photosensitive material are sequential thrust on to the drum and adhered to it as it rotates. The film to be reproduced is simultaneously driven through the projector.

This apparatus operates continuously, primarily because of the difficulty in controlling the inertia of the conveyor. Further, a shutter or flash lamp in the projector is not required with continuous operation. Large magnifications in the order of 20 times or more are usual in this apparatus. Registration errors are easily noticed in the output copy. Speed variations between the film and drum cause longitudinal smearing which are also readily observed. It is essential to this process that a film frame move through the projector in registration with and at a synchronous speed with a corresponding sheet of photosensitive material as it moves through a fixed screening area in which it is exposed.

The film is driven through the projector by a film transport. A film drive mechanism within the transport imparts motion to the film. The film drive mechanism is driven synchronously with the conveyor and, at standstill, has been aligned so that the film frames will be in registration with sheets of photosensitive paper when they move through the screening area. However, known prior art transports are not able to maintain film registration without appreciable film speed variations relative to the drive mechanism. Any film speed variations relative to its drive mechanism are naturally also relative to the moving conveyor.

PRIOR ART

The well known sprocket drive transport maintains film registration once initially established. Here, film containing sprocket holes is driven by a drive wheel containing radially extending sprocket teeth circumferentially spaced in accordance with the sprocket holes in the film. This type of drive requires that the film envelop at least a 90 degree arc of the drive wheel. The speed of the film depends on its radial distance from the axis of the drive wheel. If the thickness of the film varies, so does the speed of the film in relation to the speed of the drive wheel.

A capstan drive avoids film speed variation due to variations in film thickness if the film makes tangential contact with the capstan drive wheel only at one point. However, due to film slippage, registration errors accumulate to an intolerable level.

Another method for maintaining film registration involves the detection of the magnitude and sense of the registration error and the utilization of this information in a feedback control system to eliminate the registration error. In one system, the feedback positional error is converted to an electrical signal which is used to modify the speed of the motor which provides motion to the film drive until registration is reinstated. Another system utilizes the feedback positional error, converted to an electrical signal, to adjust tension arms acting on the film until registration is regained. In addition to the complexity of these feedback control systems, they would introduce speed variations of the film as it passes through the projector, causing smearing of the output copy.

SUMMARY OF THE INVENTION

A transport for a web having registration holes separating areas which must be accurately positioned or registered in relation to a given reference before they move through a location at which they are operated upon. The web is urged against a drive surface which drives the web at a speed invariant with that of the surface except during short intervals in which the web is registered. Registration pins which are aligned in relation to the reference, and which move synchronously with the drive surface, enter the registration holes. The web is then momentarily released from contact with the drive surface and is urged in a direction so that an edge of the registration hole engages the registration pin. The periodic registering accelerations of the web occur in the intervals when the areas between the registration holes are not moving through the location at which they are operated upon.

BRIEF DESCRIPTION OF THE DRAWING

FIG. 3 is a detailed drawing of the drive and registration control mechanisms of the film transport.

DETAILED DESCRIPTION

The same reference numbers appearing in different figures refer to the same item.

Figure 1:
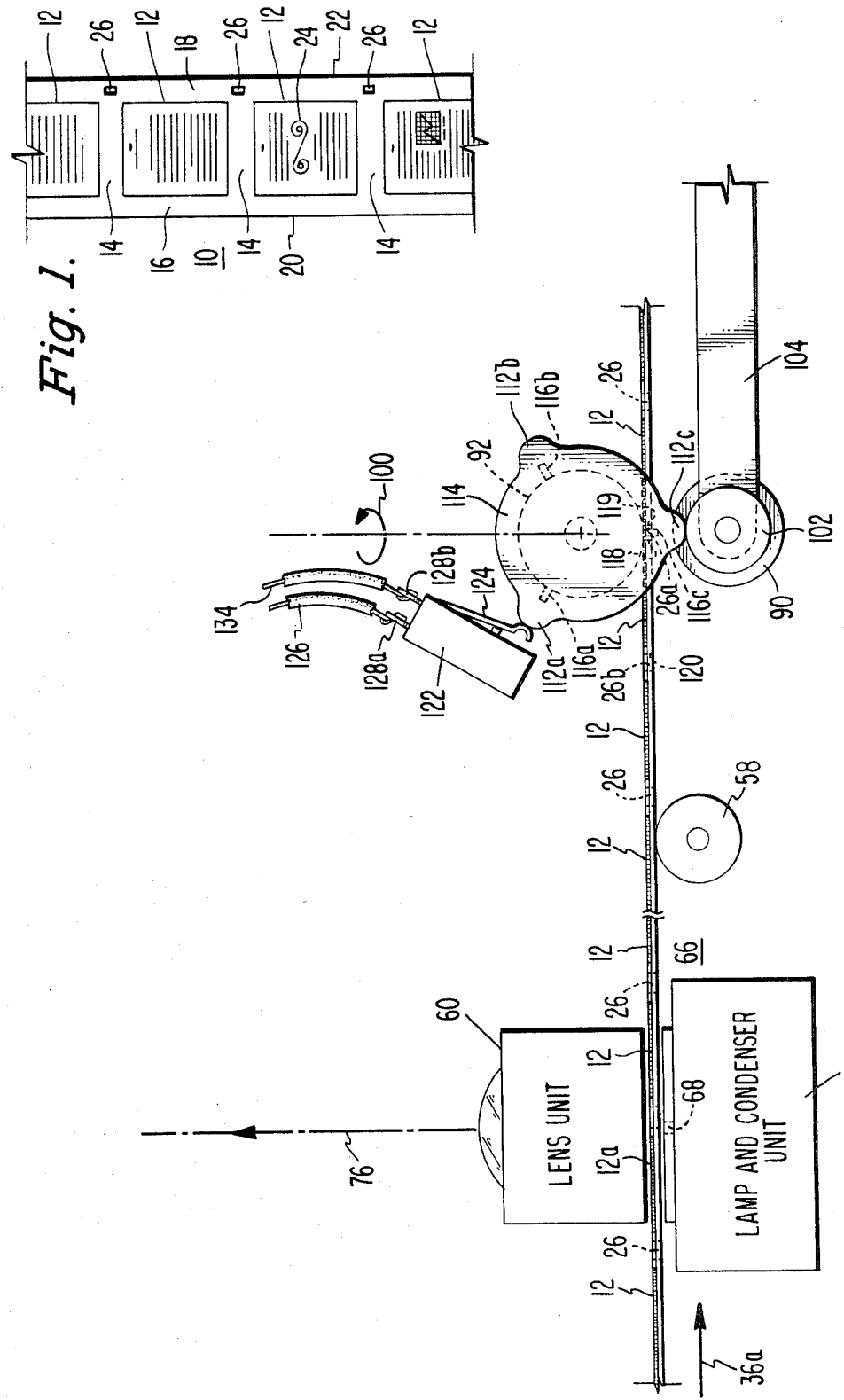
FIG. 1 is a plan view of film containing registration holes.

FIG. 1 is a plan view of a film 10 used to store pages of a document. Film 10 contains a plurality of equally sized frames 12 uniformly separated from each other by inter-frame spaces 14. Left hand margin 16 and right hand margin 18 uniformly locate frames 12 from the films' left and right edges, 20 and 22, respectively. Frames 12 contain images 24 corresponding to the pages of a document. The pages comprise textual material such as lines of print, diagrams, and continuous tone pictures. In the intersections of the right hand margin 18 and the inter-frame spaces 14 are located registration holes 26 by which film 10 may be registered. The registration holes 26 are equally spaced from one another and are longitudinally located midway between the frames 12. Of course, the film may contain registration holes along both sides of the film. Further, depending on the number of desired registrations per frame, the registration holes may be more numerous and may be located in any position relative to the frames. In the document reproduction unit to be described, film registration is permitted only between film frames to avoid blurring in the output copy. Registration holes 26 have a rectangular shape but may alternatively have any appropriate geometric shape.

Figure 2:
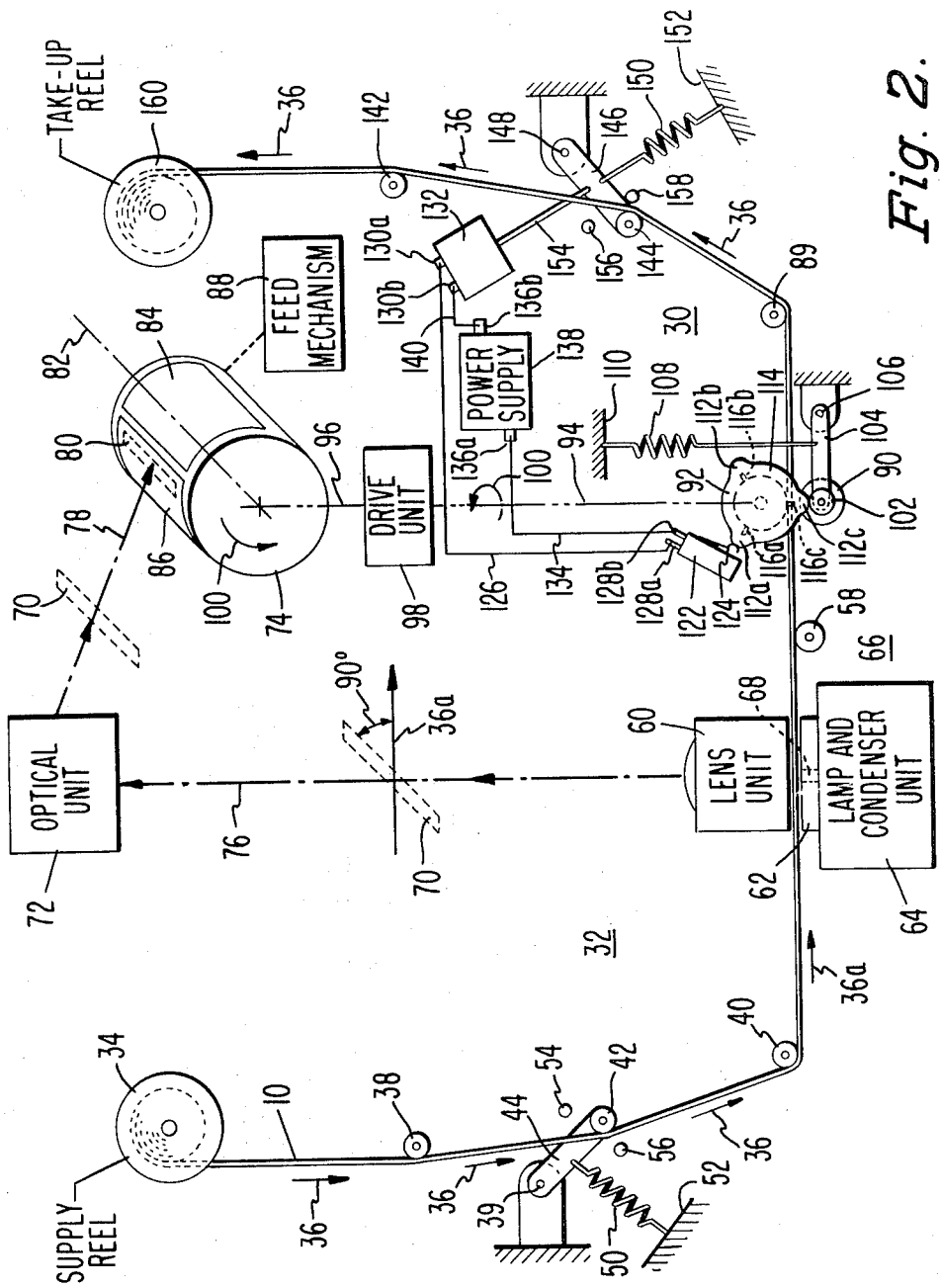
FIG. 2 is a schematic diagram of a film transport embodying the invention and useful in a document reproduction unit.

FIG. 2 is a schematic diagram of the preferred embodiment of film transport 30 as it is employed in a document reproduction unit 32. Document reproduction unit 32 is enclosed in a light tight enclosure, not shown. Supply reel 34 supplies film 10 as required. It is driven by a torque motor, not shown, in a manner causing tension of film 10 is a direction opposite that of its motion 36.

Rollers 38 and 40 guide the film 10 past a roller 42 mounted on one end of a compliance arm 44. The compliance arm 44 is pivoted at the other end at axis 38. A spring 50 is held fixed to a rigid structural member 52 at one end and is connected to the compliance arm 44 at the other. The compliance arm 44 provides slack to the film 10 so that it may be pulled in the direction of its motion 36. Stops 54 and 56 are provided to inhibit excessive angular motion of the compliance arm 44.

Rollers 40 and 58 guide the film 10 between a lens unit 60 and a plate 62. A lamp and condenser unit 64 is located below plate 62. The lens unit 60, plate 62, and lamp and condenser unit 64 comprise a slit projector 66. Plate 62 contains a narrow slit 68 perpendicular to the direction of film motion 36a through slit projector 66. Plate 62 permits only a narrow area, perpendicular to film motion 36a, of the intense beam of light generated by lamp and condenser unit 64 to impinge on film 10. Lens unit 60 magnifies the resultant narrow image portion of film 10 to form projected image area 70. Optical unit 72, comprising various mirrors, directs the projected image area 70 to a rotating cylindrical drum 74 via optical paths 76 and 78. Projected image area 70 impinges the drum 74 at screening area 80. Optical unit 72 is so arranged that the long sides of screening area 80 are parallel to the drum's axis 82.

Held to drum 74, by means not shown, are photosensitive sheets 84 and 86 which have previously been thrust upon it by feed mechanism 88. Sheet 86 is in the process of being exposed. When sheet 84 reaches screening area 80, it will be exposed. Sheet 86 is subsequently removed from drum 74 and developed and becomes a page of the document being reproduced. Alternatively, sheet 86 may be developed before it is removed from drum 74.

Rollers 58 and 89 guide film 10 in a substantially straight path between pinch roller 90 and capstan 92. Capstan 92 is co-axially connected to a drive shaft 94 which is synchronously driven with the drum's drive shaft 96, by drive unit 98, in the direction 100. Drive unit 98 may comprise a motor, not shown, and a gear arrangement, not shown, which sets the relative angular velocity of the drive shafts 94 and 96. Drive shafts 94 and 96 may be made the same shaft, eliminating the necessity of the gear arrangement in drive unit 98. Drive shaft 96 is connected co-axially to drum 74.

By virtue of the frictional forces between the surfaces of capstan 92 and film 10, capstan 92 imparts motion to film 10 when pinch roller 90 presses film 10 against it. Both pinch roller 90 and roller 102 are co-axially mounted on one end of movable arm 104. Movable arm 104 is pivoted at its other end about axis 106. Spring 108 is held fixed to a rigid structural member 110 at one end and connected to movable arm 104 at the other. The tension of spring 108 forces movable arm 104 upward toward capstan wheel 92. Pinch roller 90 presses film 10 against capstan 92 except when a lobe 112a, 112b, or 112c of cam 114 comes in contact with roller 102 and urges movable arm 104 away from capstan wheel 92.

Figure 4:
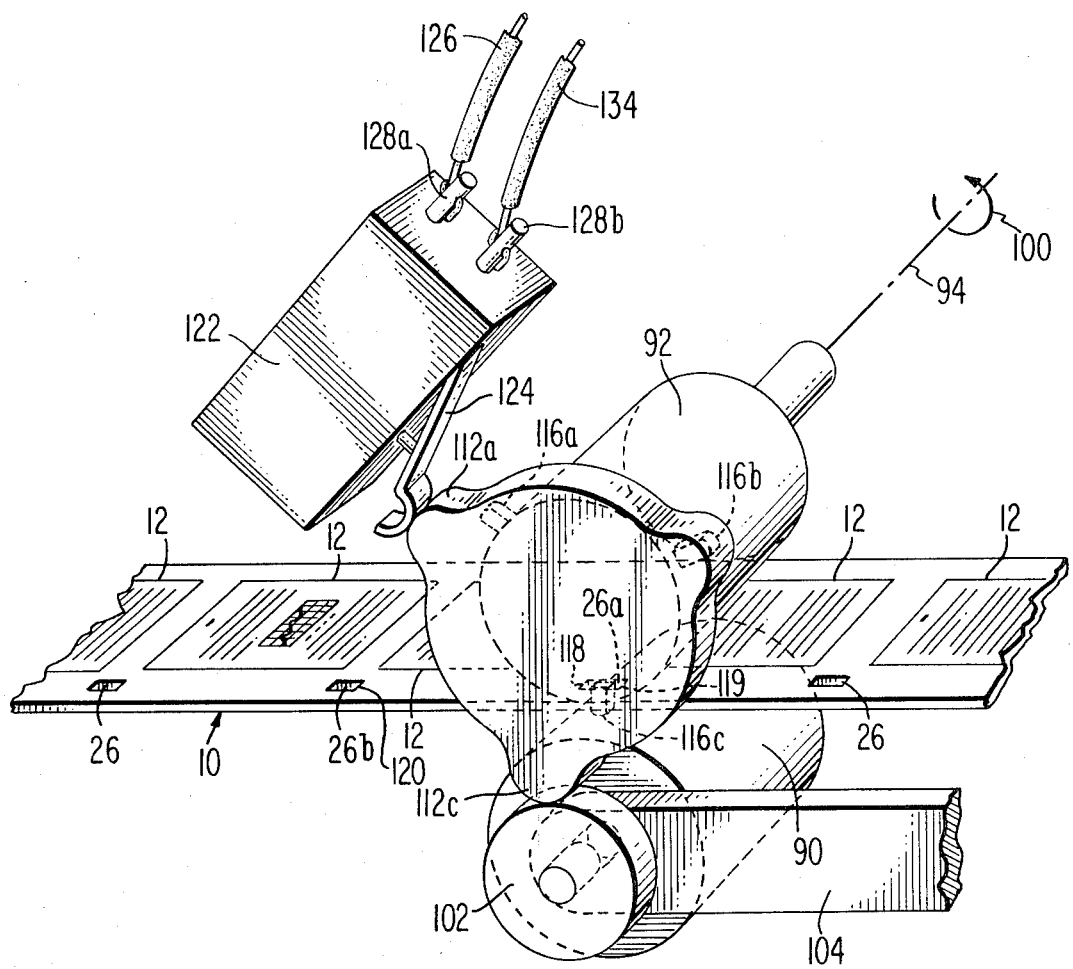
FIG. 4 is an isometric drawing of the mechanisms shown in FIG. 3.

FIG. 3 is a detailed view of the drive and registration control mechanisms of film transport 10. FIG. 4 is an isometric drawing of the mechanism shown in FIG. 3. Registration pins 116a, 116b, and 116c, extend radially from capstan 92. The registration pins are separately labeled for clarity of explanation but are all identical in form and function. Registration pins 116a, 116b, and 116c are dimensioned to freely enter registration holes 26 of film 10. The width of the registration holes 26 in the direction of film motion 36 is approximately twice that of the width of registration pins 116a, 116b, and 116c. The center to center circumferential distance between adjacent registration pins, say 116a and 116c, is less than the center to center distance between corresponding registration holes, say 26a and 26b, and is greater than the distance between the trailing edge 118 of registration hole 26a and the leading edge 120 of registration hole 26b. Since film 10 is driven a distance less than the device between adjacent registration holes in between the intervals when a registration pin enters a registration hole, registration error of frames 12 is always in the direction opposite to that of film motion 36. This relationship ensures that registration can always eliminate the registration error.

In document reproduction system 32, the angular position of the registration pins 116a, 116b, and 116c is set at standstill so that film registration ensures that a film from 12a reaches narrow slit 68 of plate 62 just as a photosensitive sheet 84 reaches screening area 80 on drum 74. Cam 114 is connected co-axially with capstan 92 and rotates synchronously with it. Lobes 112a, 112b, and 112c which protrude from cam 114 are symmetrical and are circumferentially located so that their axes of symmetry are in alignment with the center lines of registration pins 116a, 116b, and 116c, respectively. The lobes are separately labeled for clarity of explanation but are all identical in form and function. Cam 114 contacts roller 102. Microswitch 122 is so positioned that its actuator arm 124 may be contacted by lobes 112a, 112b, and 112c. FIG. 3 shows the angular position of cam 114 at the beginning of the registration period. Lobe 112c is in contact with roller 102 urging movable arm 104 away from capstan wheel 92. Pinch roller 90 is forced away from capstan 92 allowing the film to be moved freely with respect to capstan 92. Lobe 112a is in contact with actuator arm 124 of microswitch 122. Registration pin 116c has entered registration hole 26a but is not in contact with its leading and trailing edges, 119 and 118, respectively. Film frame 12a has just about reached narrow slit 68. Between registration periods, film 10 is pressed between pinch roller 90 and capstan 92 which imparts motion to it, lobes 112a, 112b, and 112c do not contact either roller 102 or actuator arm 124, and registration pins 116a, 116b, and 116c do not engage any registration holes 26.

Referring back to FIG. 2, it may be seen that electrical lead 126 connects terminal 128a of microswitch 122 to terminal 130a of solenoid 132. Electrical lead 134 connects terminal 128b of microswitch 122 to terminal 136a of power supply 138. Terminal 136b of power supply 138 is connected to terminal 130b of solenoid 132 by electrical lead 140. Microswitch 122 is of the normally-closed type. Terminal 128a is connected to the arm, not shown, of microswitch 122 and terminal 128b is connected to the normally-closed contact, not shown, of microswitch 122. Actuator arm 124 opens the arm of microswitch 122 only when contacted by any of the lobes 112a, 112b, or 112c of cam 114.

Rollers 89 and 142 guide film 10 past a roller 144 mounted on one end of a registration arm 146. Registration arm 146 is pivoted at the other end at axis 148. Spring 150 is held fixed to a rigid structural member 152 at one end and is connected to registration arm 146 at the other. Armature 154 of solenoid 132 is also connected to registration arm 146. When the arm of microswitch 122 is closed, solenoid 132 is activated and armature 154 holds registration arm against stop 156. Spring 150 is stretched by virtue of the force exerted on registration arm 146 by armature 154. When the arm of microswitch 122 is opened, solenoid 132 is de-energized and armature 154 is released allowing registration arm 146 to be pulled by spring 150. Consequentially, film 10 is pulled in the direction of film motion 36 by the force exerted on it by roller 144. Stop 158 is provided to limit the movement of registration arm 146.

Take up reel 160 takes up film 10 as required. It is driven by a torque motor, not shown, in such a way as to cause a tension on film 10 in direction of film motion 36.

OPERATION

Drive unit 98 synchronously and continuously drives capstan 92 and drum 74 via drive shafts 94 and 96, respectively. Film 10 is driven and registered by transport 30 and moves from supply reel 34, through slit projector 66, and is taken up by reel 160. A sheet 84 of photosensitive material, previously thrust on to drum 74 by feed mechanism 88, is carried by drum 74. The speed of photosensitive sheet 84 is synchronous with the speed of film 10 by virtue of the common drive provided by drive unit 98.

The information contained in frames 12 of film 10 is transmitted to drum 74 by optical unit 72. Projected image area 70 impinges on drum 74 within screening area 80. When a photosensitive sheet 84 reaches image area 80, it is exposed continuously as a corresponding film frame 12 passes through projector 66.

At standstill, registration pins 116a, 116b, and 116c have been angularly orientated so that a film frame 12 reaches narrow slit 68 of plate 62 just as a photosensitive sheet 84 reaches the beginning of screening area 80. Film 10 is initially placed in registration. As film 10 is transferred from supply real 34 to take up reel 160, through projector 66, it is periodically registered at intervals between those during which frames 12 are projected.

Film 10 is guided between pinch roller 90 mounted on movable arm 104 and capstan wheel 92. Spring 108 forces movable arm 104 toward capstan 92. Cam 114 rotates synchronously with capstan 92. As long as one of the lobes 112a, 112b, or 112c of cam 114 is not in contact with the roller 102 mounted on movable arm 104, pinch roller 90 presses film 10 against capstan 92 and the film is driven at the same speed as capstan 92. Because film 10 makes tangential contact with capstan 92 only at one point, variations of film thickness do not cause corresponding film speed variations relative to capstan wheel 92.

The registration process will be described with reference to a particular lobe, say 112c, and corresponding registration pin 116c, but, of course, pertains also to each of the lobes 112a, 112b, and 112c, and the corresponding registration pins 116a, 116b, and 116c, respectively. As lobe 112c reaches and contacts roller 102, adjacent lobe 112a reaches and contacts actuator arm 124 of microswitch 122. This position of cam 114 initiates two essentially simultaneous events. The first event is that lobe 112c forces movable arm 104 away from capstan 92 by virtue of the force exerted on roller 102, and thereby pinch roller 90 moves away from film 10. Shortly before pinch roller 90 looses contact with film 10, registration pin 116c protrudes into registration hole 26a, but does not touch film 10. Film 10 is free to move relative to capstan 92 when pinch roller 90 has lost contact with it.

The second event is triggered by the contact of lobe 112a with actuator arm 124. The force exerted by lobe 112a against actuator arm 124 is sufficient to open the conductive path within normally-closed microswitch 122. The opening of microswitch 122 disconnects power supply 138 from solenoid 132 and consequentially solenoid 132 is de-energized and releases armature 154. Registration arm 146 is then free to move and is pulled by spring 150. Roller 144, mounted on registration arm 146, pulls the film 10 forward in direction of its motion 36 until the back surface registration pin 116c engages the trailing edge 118 of registration hole 26a. Compliance arm 144 provides slack to film 10 when it is pulled forward by roller 144. Registration has now been completed.

As lobe 112c moves away from roller 102, pinch roller 90 is again forced to press film 10 against capstan 92. Simultaneously, lobe 112a looses contact with actuator arm 124, closing the conduction path within microswitch 122 and re-connecting power supply 138 to solenoid 132. Solenoid 132 is re-energized, forcing registration arm 146 against stop 156. At this point, frame 12a has reached narrow slit 68. The next registration period begins when lobe 112b reaches roller 102 and registration is again initiated.

Although the preferred embodiment of the transport has been described in relation to a document reproduction unit, it is evident that the invention has application in any machine wherein registration of a film, tape, or other type of web must be periodically performed.

What is claimed is:

1. A transport for a web having registration holes, comprising:
    a drive surface,
    urging means normally urging the web into contact with said drive surface,
    at least one registration pin moving synchronously with said drive surface and dimensioned and positioned to freely enter a registration hole in the web, first means operative during the time that a registration pin is in a registration hole to prevent said urging means from urging the web into contact with said drive surface, and second means also operative during the time that a registration pin is in a registration hole for moving the web so that an edge of the registration hole engages the registration pin, whereby the web is accurately registered.

2. A transport as defined in claim 1, wherein said drive surface and said urging means include:

a capstan, and a pinch roller, between which the web is guided in a substantially straight path, said pinch roller normally urging the web into contact with said capstan so that web is driven by the capstan.

3. A transport as defined in claim 2 wherein said registration pins extend radially from said capstan.

4. A transport as defined in claim 2 wherein said first means includes a cam rotated in synchronism with said capstan.

5. A transport as defined in claim 4 wherein said second means includes a switch actuated by said cam, a solenoid activated by said switch, and a web tensioning device operated by said solenoid.

6. A transport as defined in claim 2 wherein the center to center distance between a registration pin and a circumferentially adjacent registration pin is less than the center to center distance between registration holes in the web but greater than the distance between the trailing edge of one registration hole and the leading edge of the following registration hole.

7. A transport as defined in claim 2 wherein said capstan is continuously rotating.

8. A transport as defined in claim 2 wherein said first and said second means are operative solely during the time that a registration pin is in a registration hole.

9. A transport for a web containing registration holes, comprising:

a continuously rotating capstan, and a pinch roller, between which the web is guided in a substantially straight path, said pinch roller normally urging the web into contact with the capstan so that the web is driven by the capstan, at least one registration pin extending radially from said capstan and dimensioned to freely enter registration holes in the web and spaced at a center to center distance from a circumferentially adjacent registration pin less than the center to center distance between registration holes in the web and greater than the distance between the trailing edge of one registration hole and the leading edge of the following registration hole, a cam rotated in synchronism with said capstan for moving said pinch roller away from the web during the time that a registration pin is in a registration hole, a switch actuated by said cam also during the time that a registration pin is in a registration hole, a solenoid activated by said switch, and a film tension device operated by said solenoid to pull the web in the forward direction causing the trailing edge of the registration hole to engage the registration hole.

* * * * *